United States Patent [19]
Pitner

[11] 3,802,754
[45] Apr. 9, 1974

[54] NEEDLE BEARING
[75] Inventor: Alfred Pitner, Paris, France
[73] Assignee: Nadella, Malmaison, France; a part interest
[22] Filed: June 21, 1972
[21] Appl. No.: 264,777

[30] Foreign Application Priority Data
Aug. 17, 1971 France .......................... 71.29917

[52] U.S. Cl. ............................................. 308/217
[51] Int. Cl. ........................................... F16c 33/46
[58] Field of Search ..................... 308/217, 235, 201

[56] References Cited
UNITED STATES PATENTS
1,147,497   7/1915   Freed ................................. 308/217
3,572,862   3/1971   Teramachi ......................... 308/235

FOREIGN PATENTS OR APPLICATIONS
1,206,799   9/1970   Great Britain ..................... 308/217
1,372,124   10/1964  France ............................... 308/217
1,445,363   5/1966   France ............................... 308/217

Primary Examiner—Charles J. Myhre
Assistant Examiner—Frank Susko
Attorney, Agent, or Firm—Robert E. Burns; Emmanuel J. Lobato

[57] ABSTRACT

Needle bearing in which the apertures of the cage guiding the needles have at at least one end of the apertures a convex projecting portion which is engageable with a plane end face of the corresponding needle which is of the type having plane end faces. Retaining means are provided on the cage adjacent the apertures for retaining the needles in at least one direction.

5 Claims, 4 Drawing Figures

PATENTED APR 9 1974 3,802,754
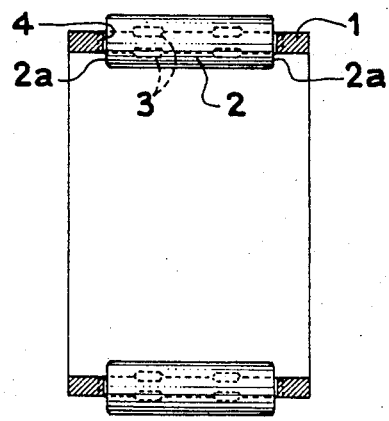
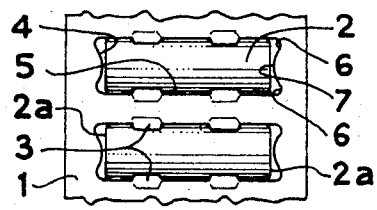
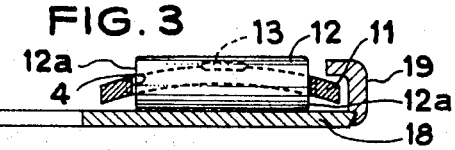
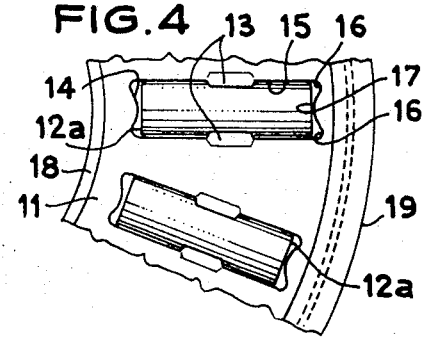

NEEDLE BEARING

The present invention relates to radial and axial needle bearings comprising a cage for retaining and guiding the needles.

The needles usually employed have convex end portions, that is, portions constituted by a substantially part-spherical dome connected by an annular surface of small radius to the cylinder constituting the rolling surface of the needle. This shape has for drawbacks a higher manufacturing cost and a reduction in the useful length of the cylindrical surface of the needle relative to its overall length. However, it is preferred to the plane end shape, since, when the axis of the needle becomes inclined relative to the axis of the cage aperture in which the needle is contained, the corner defined by a plane end with the cylindrical surface of the needle engages corners of the aperture and produces, owing to the relatively high speed of rotation, wear and heating. This even occurs when the end is perfectly plane and perpendicular to the axis of the aperture. When this is not the case owing to the preference given to particularly cheap methods of manufacture, the phenomenon is amplified and becomes the cause of a rapid destruction of the cage owing to the to-and-fro axial movement of the loaded needle, this usually being accompanied by noise.

An object of the invention is to provide a cage having such shape that needles having plane ends may be employed so as to take advantage of the resulting cheapness and increased useful length of the needles.

More precisely, the invention provides a needle bearing comprising a cage constructed from a single piece and having apertures which contain needles having plane ends and include means for retaining the needles in at least one direction, wherein at least one of the end faces of the apertures has a projecting portion having a convex shape serving as a bearing face for the adjacent plane end of the needles.

The cage is preferably of thin sheet metal, the projecting portions being formed directly in the course of the punching of the apertures in the sheet.

Such an arrangement, which is applicable to both a radial bearing and a thrust or axial bearing, is distinguished from the prior art represented by the following references:

Austrian Pat. No. 54,931 in which is disclosed a radial roller bearing whose sheet metal cage includes press-formed conical projecting portions which extend into hollows formed in the plane faces of the rollers.

French Pat. No. 1,489,628 relating to a thrust bearing cage whose apertures are formed within the thickness of the cage by a radial drilling and arm closed by an attached end member which may be convex at its centre.

British Pat. No. 1,223,249 which concerns a thrust roller bearing whose cage consists of three assembled parallel washers, the centre washer, which guides the rollers, having a convex projecting portion in one of the ends of its roller-guiding apertures.

Two embodiments of the needle bearing according to the invention are shown in the accompanying drawing in which:

FIG. 1 is a diametral sectional view of a radial or journal rolling bearing;

FIG. 2 is a plan view of a part of this bearing;

FIG. 3 is a diametral sectional view of an axial or thrust rolling bearing, and

FIG. 4 is a plan view of a part of the bearing shown in FIG. 3.

The radial bearing shown in FIGS. 1 and 2 comprises a cylindrical cage 1 obtained by punching, rolling and welding a thin sheet metal blank, the apertures 5 containing needles 2. The latter are radially retained by localized deformed portions 3 of the cage and have plane ends 2a adjacent corresponding projecting portions 7 which are formed, in the course of the punching of the apertures in the sheet metal, in the centre part of the end faces 4 of the apertures 5. These projecting portions define two lateral notches or recesses 6 and ensure that the rounded annular portions connecting the plane faces 2a to the cylindrical surface of the needles do not come in contact with the corners of the apertures under the effect of the axial thrust of the needles which is often very high.

The thrust rolling bearing shown in FIGS. 3 and 4 comprises a dished cage 11 formed by the blanking and forming of a sheet metal blank, the apertures 15 of which are deformed locally into lugs 13 so as to axially retain the needles 12 in one direction whose flat or plane ends 12a bear against two convex projecting portions 17 which are cut from the sheet of the cage at the ends 14 of the apertures and define lateral recesses 16.

The rolling bearing is completed by a raceway plate 18 which is combined with the cage by means of an attached ring 19 and which axially retains the needles in the direction opposed to the direction of retention afforded by the lugs 13.

Having now described my invention what I claim as new and desire to secure by Letters Patent is:

1. In a needle bearing: bearing needles, a cage consisting of a single piece of sheet metal, means defining apertures in the cage, the apertures being guidingly combined with the needles, each aperture having two end faces, means constituted by a portion of the cage and associated with the apertures for retaining each of the needles in at least one direction radially of the needle, each needle having two plane end faces respectively adjacent the end faces of the corresponding aperture, and a projecting portion on at least one of said end faces of each aperture, the projecting portion having a convex face which is in facing relation to and capable of having a line contact with the adjacent plane end face of the corresponding needle, the surface of each projecting portion being in a work-hardened condition produced by the rubbing of a punch along said surface when said punch pierces the cage for forming the corresponding aperture.

2. A needle bearing as claimed in claim 1, wherein the cage is cylindrical.

3. A needle bearing as claimed in claim 1, wherein the bearing is an axial needle bearing and a plate defining a raceway for the needles is in an axially attached relation to the cage.

4. In a needle bearing: bearing needles, a cage consisting of a single piece of sheet metal, means defining apertures in the cage, the apertures being guidingly combind with the needles, each aperture having two end faces, means constituted by a portion of the cage and associated with the apertures for retaining each of the needles in at least one direction radially of the needle, each needle having two plane end faces respectively adjacent the end faces of the corresponding aperture, and a projecting portion on each of said end faces of each aperture, the projecting portion having a convex face which is in facing relation to and capable of having a line contact with the adjacent plane end face of the corresponding needle, the surface of each projecting portion being in a work-hardened condition produced by the rubbing of a punch along said surface when said punch pierces the cage for forming the corresponding aperture.

5. A needle bearing as claimed in claim 1, wherein said convex face has a shape substantially defined by a radius of curvature dimension which is at least one half the diameter of the needle.

* * * * *